United States Patent [19]

Carlton

[11] Patent Number: 4,628,365
[45] Date of Patent: Dec. 9, 1986

[54] RADIATION FILTER

[76] Inventor: Roger Carlton, Periphlex Inc., 5230 Finch Ave. E., Unit 5, Scarborough, Ontario, Canada, M1S 4P1

[21] Appl. No.: 844,241

[22] Filed: Mar. 17, 1986

Related U.S. Application Data

[63] Continuation of Ser. No. 540,932, Oct. 11, 1983, abandoned.

[51] Int. Cl.⁴ .................... H04N 5/65; H04N 5/72
[52] U.S. Cl. ................................ 358/245; 358/253; 340/700
[58] Field of Search ........... 358/245, 267, 252, 253, 358/248, 249, 254, 255; 340/700, 705; 313/478

[56] References Cited

U.S. PATENT DOCUMENTS

| | | | |
|---|---|---|---|
| 2,734,142 | 2/1956 | Barnes | 358/253 |
| 2,922,998 | 1/1960 | Stephenson | 358/252 |
| 2,977,412 | 3/1961 | Rhodes et al. | 358/252 |
| 3,947,620 | 3/1976 | Plant et al. | 358/247 |
| 4,246,613 | 1/1981 | Choder et al. | 358/253 |
| 4,253,737 | 3/1981 | Thomsen et al. | 358/252 |
| 4,412,255 | 10/1983 | Kuhlman et al. | 358/252 |
| 4,468,702 | 8/1984 | Janchell | 358/245 |
| 4,485,329 | 11/1984 | Donofrio et al. | 358/247 |
| 4,504,867 | 3/1985 | Keller | 358/247 |

Primary Examiner—James J. Groody
Assistant Examiner—John K. Peng
Attorney, Agent, or Firm—Hirons, Rogers & Scott

[57] ABSTRACT

A filter to absorb spurious radiation from a video display terminal comprises a sheet of radiation absorbent material having an open woven mesh overlieing one surface of the material. The filter is mounted in the terminal so that the mesh faces the operator. The mesh is effective to prevent reflection of incident light from the material.

9 Claims, 3 Drawing Figures

RADIATION FILTER

This is a continuation of application Ser. No. 06/540,932, filed 10/11/83, now abandoned.

The present invention relates to radiation filters and in particular to radiation filters suitable for use with a video display terminal.

The general acceptance of computer technology has led to the widescale use of video display terminals in the office and work environment. Such terminals may be used by operators on an intermittent basis but more often are used by operators on a continuous basis for long periods. While such terminals are generally considered safe there is concern that long term exposure to spurious radiation from the terminals may present a health hazard. Whilst there is no positive data to suggest such a risk at the present time it is nevertheless desirable to allay such fears by reducing the potential for spurious radiation emission.

Various materials are known which are capable of absorbing the type of radiation emitted from video display terminals but these are generally not acceptable within the working environment in which such terminals are located. Generally the materials are formed as a transparent sheet which, whilst absorbing the radiation, also present reflective surfaces. The reflections from these surfaces may be acceptable where the material is simply being used as a shield with the capability of occasional observation but where the material is to be viewed on a continous basis the reflections are unacceptable. This is particularly true in an office environment where the high level of lighting already introduces reflection problems with conventional video display terminals.

The mesh 14 is secured to the periphery of the material by a suitable adhesive 20, and a frame 18 having a U shaped cross section is placed around the periphery of the material 12 to cover the edge of the material 13 and mesh 14.

Accordingly it is an object of the present invention to provide a radiation filter suitable for use on a video display terminal which obviates or mitigates the above disadvantages.

According therefore to the present invention there is provided a radiation filter for the screen of a video display terminal comprising a transparent sheet of radiation absorbent material dimensioned to extend across said screen and an open mesh material juxtaposed on said sheet of radiation absorbent material and secured thereto, said sheet of radiation absorbent material being interposed between said mesh and said screen to absorb radiation emitted therefrom.

The sheet of radiation absorbent material is effective to absorb the spurious radiation being emitted from the terminal whereas the open mesh material is effective to prevent incident light being reflected from the surface of the radiation absorbent material without inhibiting the operator's view of the video display screen.

An embodiment of the invention will now be described by way of example only with reference to the accompanying drawings in which.

Figure 1:
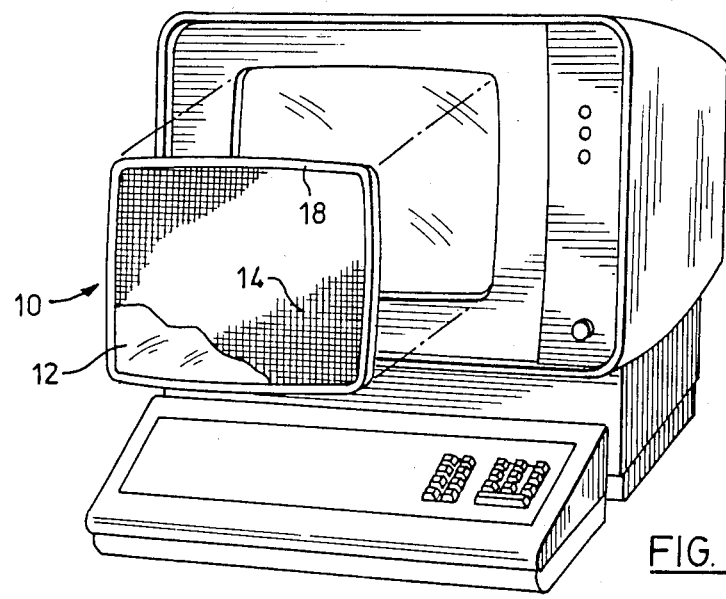
FIG. 1 is a general perspective view of a radiation filter.
Figure 2:
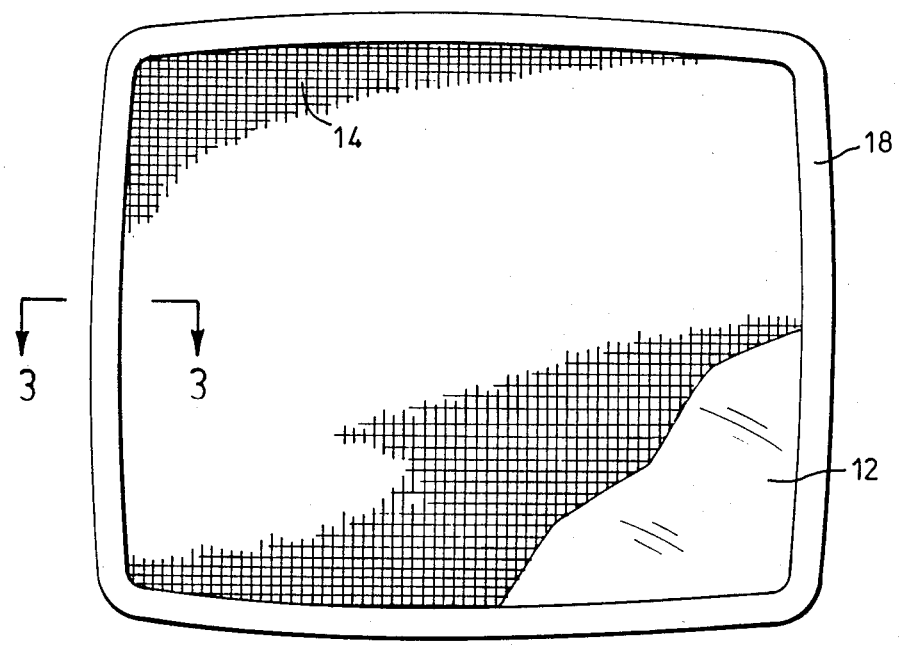
FIG. 2 is a front elevation of the filter shown in FIG. 1.
Figure 3:
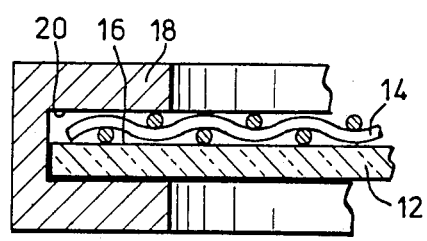
FIG. 3 is a view on the line 33 of FIG. 2.

Referring now to the drawings a radiation filter generally designated 10 for use on a video display terminal 8 comprises a sheet of radiation absorbent material 12 having an open weave mesh 14 overlying one of the surfaces 16. A frame member 18 extends around the perphery of the sheet 12 and is secured thereto by suitable cement as indicated at 20 in FIG. 3. The mesh 14 is interposed between the frame 18 and the surface 16 so that the cement 20 is also effective to secure the mesh 14 to the material 12.

The radiation filter 10 is dimensioned to fit over a conventional video display terminal, either by fitting between the casing and the video display screen or by attaching to the exterior of conventional casing. The filter is installed with the mesh 14 directed toward the operator so that light incident upon the filter will be absorbed by the mesh 14. Similarly radiation emitted from the video display terminal will be absorbed by the sheet of material 12 to avoid transmission to the operator.

The material 12 is preferably an acrylic copolymer resin into which lead is chemically introduced as a organo lead salt compound. A suitable material is sold by Langley-St. Clair Instrumentation Systems, Inc. under the trade mark EYE-GUARD and has a thickness of 7 mm. The use of an acrylic copolymer resin permits conventional fabrication techniques such as thermoforming, machining and cementing to be used so that the sheet 12 may easily be cut; if desired, bent to conform to the curvature of the video display terminal, and secured to the frame 18 by a suitable adhesive such as The mesh 14 is preferably a woven synethic monofilament screen such as that sold under the trade name NITEX by Tetko Inc. Suitable materials are those sold under the code numbers HC3-136; HC3-125; HC3-90 and HC3-60. These materials are woven from a nylon monofilament and have a space between adjacent fibers of between 136 and 60 microns depending on the particular mesh used. The percentage of the mesh that is open area ranges between 45 percent for the HC3-60 material up to 55 percent for the HC3-136. It has been found that these grades of material provide satisfactory transmission of light through the filter whilst inhibiting reflections from light incident upon the filter from the ambient environment.

The frame 18 may be formed from any suitable plastics material that may be readily cemented to the surface 16 of the radiation absorbent material 12. Other forms of fastening may be used such as mechanical fasteners but it is believed that the use of an adhesive is preferable for ease of manufacture.

The desired tautness of the mesh may be obtained by stretching the mesh over the sheet of material 12 prior to attachment of the frame 18 and this may be conveniently achieved by initially stretching the mesh 14 and then elevating the material 12 from below the plane of the mesh to above it and holding it in that position whilst the frame 18 is secured.

The material 12 is sufficiently flexible to conform to the curvature of most video display screens and permit the filter to be installed between the casing and the screen of most units. However, in some installations it may be preferable to attach the filter to the exterior of the casing so that it is spaced from the surface of the video display screen.

Whilst the use of an acrylic copolymer resin is preferred other radiation absorbent materials such as lead glass could be used. However, the acrylic copolymer resin provides the desired radiation absorbency whilst retaining the desired optical and weight characteristics. In the preferred material described above, a 7 mm thick sheet 12 presents the equivalent of a 0.3 mm thick sheet of lead whilst having a density of only 1.6 grams per cm$^3$. The material contains 30 percent lead by weight. However the refractive index of the acrylic copolymer resin is 1.54 compared with the refractive index of 1.98 for lead glass so that the reflection is less with the acrylic copolymer resin than lead glass.

It will be seen therefore that the filter of the present invention provides the facility for absorbing the spurious radiation that may be emitted from the video display terminal whilst at the same time excluding the annoying reflections that normally occur on video display screens from the incident light.

The embodiments of the invention in which an exclusive property or privilege is claimed are defined as follows:

1. A radiation filter for the screen of a video display terminal comprising a transparent sheet of radiation absorbent material dimensioned to extend across and be disposed adjacent to said screen, an open mesh material juxtaposed on a surface of said sheet of radiation absorbent material directed away from said screen and means to secure said mesh to said sheet, said sheet of radiation absorbent material being interposed between said mesh and said screen to absorb radiation emitted therefrom, whereby light incident upon and transmitted through said sheet is absorbed by said mesh.

2. A radiation filter according to claim 1 wherein said radiation absorbent material is an acrylic copolymer resin having lead dispersed therein.

3. A radiation filter according to claim 2 wherein said lead is introduced into said resin as an organo lead salt compound.

4. A radiation filter according to claim 1 including a frame extending around the periphery of said radiation absorbent material with said mesh being interposed between said frame and said material.

5. A radiation filter according to claim 4 wherein said frame is cemeted to said material to secure said mesh to said material.

6. A radiation filter according to claim 1 wherein said mesh is woven.

7. A radiation filter according to claim 4 wherein the distance between adjacent fibres is between 60 and 136 microns.

8. A radiation filter according to claim 6 wherein said mesh is woven from a monofilament fibre.

9. A radiation filter according to claim 8 wherein said fibre is nylon.

* * * * *